March 15, 1949. V. C. BELT 2,464,288
FUEL INJECTION MEANS FOR COMBUSTION ENGINES
Filed April 21, 1945 2 Sheets-Sheet 2

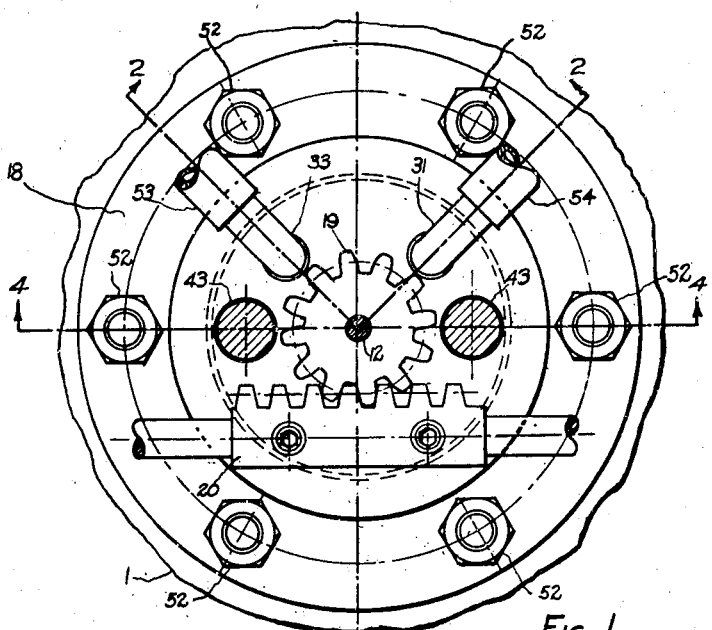
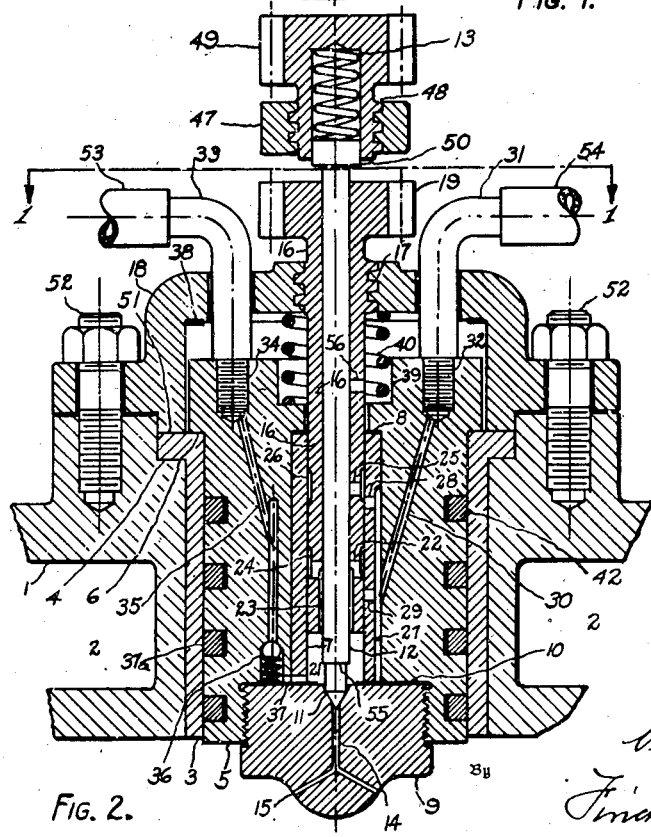

Inventor
Vernon C. Belt
By Finckel & Finckel
Attorney

Patented Mar. 15, 1949

2,464,288

UNITED STATES PATENT OFFICE 2,464,288

FUEL INJECTION MEANS FOR COMBUSTION ENGINES

Vernon C. Belt, Summit, N. J.

Application April 21, 1945, Serial No. 589,560

8 Claims. (Cl. 299—107.2)

This invention relates to fuel injection means for an internal combustion engine, and more particularly to injection means whereby the fuel is injected by the direct action of the compression pressure in the combustion space.

One object of the invention is to provide improved means for injecting fuel into the combustion space of an internal combustion engine whereby the result is accomplished by the pressure in the combustion space and being of such a nature that practically the full force of the compression pressure is utilized to accomplish the injection throughout the injection period.

Another object is to provide in a fuel injection device actuated by the compression pressure means that causes the injection to start and end rapidly thus insuring that fuel injected at the beginning and end of the injection is atomized (so-called) properly.

A further object is to provide in a fuel injection device actuated by the compression pressure means whereby fuel during part of each cycle is allowed to flow through the device thus insuring that none of the fuel remains in the device long enough to vaporize and render the unit inoperative.

A still further object is to provide a fuel injection device actuated by the compression pressure in which the many characteristics essential for efficient engine operation at varying loads and speeds can be attained by means incorporated in the device in a manner such that the said fuel injection device is extremely simple in form, relatively easy to manufacture, and of a nature such that it can be rehabilitated with a minimum of time, effort, and replacement parts.

While my injection means is intended primarily for compression-ignition engines, it also is applicable to spark-ignition engines to provide better control of the fuel to the several cylinders where companion cylinders are employed. Because of its simplicity, and the elimination of many of the parts in other more cumbersome means of injection, my invention lends itself to aeronautical engine application. The utilization of this invention for aeronautical engines would enhance the many inherent advantages of the compression-ignition type of such engines.

The invention can be used on either two-cycle or four-cycle engines as in either type there is an appreciable pressure rise in the cylinder on the compression stroke only. Because in my invention the fuel is injected by the pressure in the cylinder and the timing of injection in the engine cycle is controlled by the rise in the compression pressure, there is no need for cams, rocker arms, followers, gears, and so forth employed by conventional systems. As a consequence, it makes possible the use of a two-cycle engine with no valves or cam shafts and results in extreme simplicity and high mechanical efficiency. The invention as presented may be used in either an open-combustion chamber type of construction or in the many ante-chamber, turbulent-chamber, or air-chamber designs, and it also permits the use of most types of nozzle now in common favor.

The invention provides many unique features not heretofore attained in an injection unit of this type. It provides a by-pass for part of the fuel so that in each cycle of the injector's operation a quantity of fuel passes through the unit, thus making sure that none of the fuel remains in the injector long enough to vaporize, a condition fatal to the successful operation of such an injector. The injector is so constructed that during an injection period almost the entire force of the compression pressure acting on the end of the injector is utilized to inject the fuel into the combustion space. The only forces which oppose the main force are the force of a weak return spring and the force of the friction of the injector. In my construction heavy springs which tend to make the net actuating force increasingly less as the injection progresses are avoided. Means are provided whereby injection starts and ends quickly with no dribbling at the nozzle after injection ends. These factors insure a high degree of atomization (so-called) of all of the fuel injected and consequently more efficient combustion. Means are also provided to take care of any leakage past the lapped fits of the injection apparatus and to provide for the lubrication of the injector.

The injector is constructed so that when the parts accomplishing the injection become worn, they may be replaced easily. In fact in the construction shown only four parts need be replaced to completely renew the injection means proper and wherever wear is likely to occur provision is made so that the unit can be rehabilitated with the minimum of time, effort, and materials. The construction is such that in a multi-cylinder engine provisions can be made to remove an injection unit without stopping the engine, a feature of importance in stationary engines.

In the accompanying drawings, I have illustrated a preferred embodiment of my invention. In these drawings—

Fig. 1 is a top plan view with parts in section of the injection unit looking downward from line 1—1 of Fig. 2.

Fig. 2 is a central vertical section of the injection unit at the plane 2—2 indicated in Fig. 1.

Figure 3:
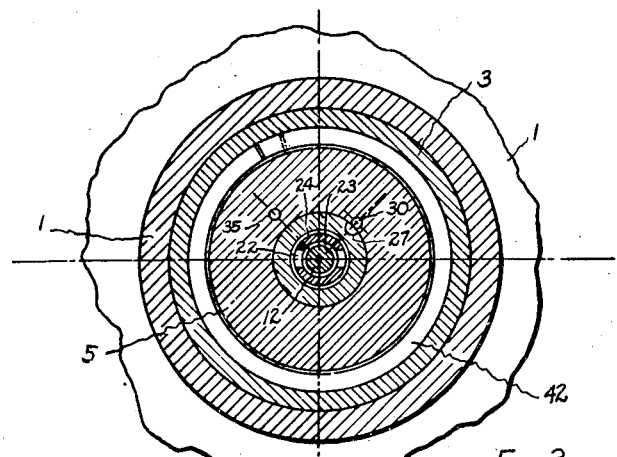
Fig. 3 is a horizontal section of the injection unit taken through plane 3—3 of Fig. 4 looking down.
Figure 4:
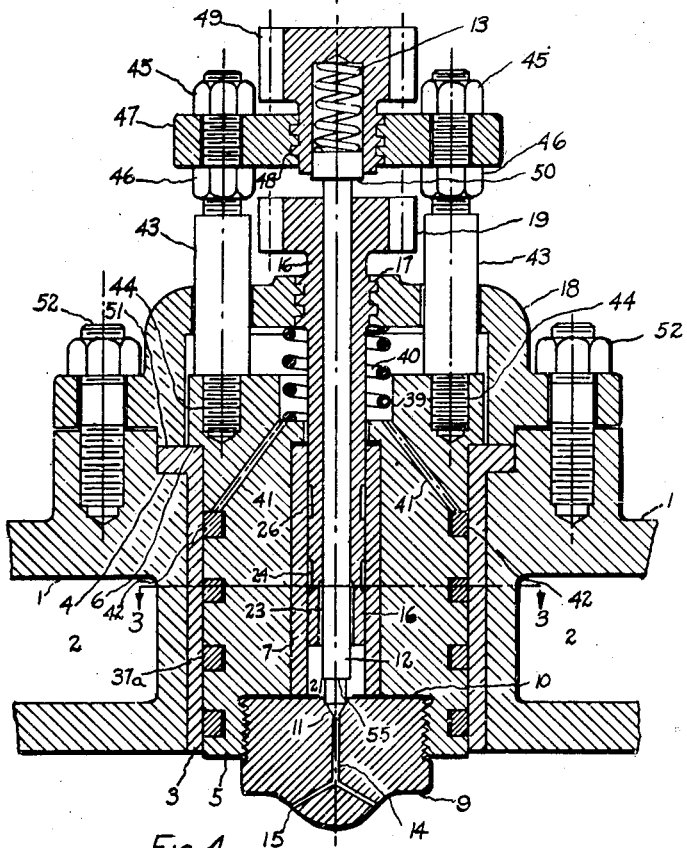
Fig. 4 is a central vertical section taken on the plane 4—4 of Fig. 1.

In the views the numeral 1 designates the cylinder head of an internal combustion engine having in it water passages 2. Inserted in a hole in the cylinder head 1 is a removable sleeve 3 having a flange at its outermost end that seats on the cylinder head at 4. Slidably mounted within the sleeve 3 is a piston 5 having a flange 6 at its outer end that seats on the upper surface of the sleeve 3.

Within a central bore in piston 5 is located a cylindrical sleeve 7 held in place against a gasket at 8 by the nozzle 9. The nozzle 9 is fastened into the piston 5 by a threaded portion against a gasket at 10. Centrally located in the upper surface of nozzle 9 is a valve seat 11 against which valve 12 is yieldingly held by the action of a spring 13. The valve stem is provided with an annular ring at 55. Leading downward from valve seat 11 is a hole 14 which leads to various openings 15 into the combustion space. The form of the nozzle can be varied from that shown, without changing the rest of the injection means.

Contained within the sleeve 7 and around the valve stem 12 is another sleeve 16 with a threaded upper portion at 17 which is engaged with mating threads in the cover 18. At the uppermost end of sleeve 16 is a gear 19 that meshes with control rack 20. At the lower end of sleeve 16 there is provided an annular passage 23 between chamber 21 and holes 22 in the sleeve 16. On the outer surface of sleeve 16 is an annular recess at 24 which is in communication with chamber 21 through annular passage 23 and holes 22. Farther up on sleeve 16 is a hole or holes 25 and an annular recess 26 on the outside of sleeve 16.

On the outside of sleeve 7 is an axial groove 27. Holes 28 and 29 register in sleeve 7 with said groove 27. A hole 30 bored through the piston 5 brings annular groove 27 into communication with the by-pass line 31 which is screwed at 30 into piston 5. An oil supply line 33 is screwed at 34 in the same manner into the piston 5. The passage 35 connects the fuel supply line 33 downward through the piston 5 with a spring loaded ball check valve at 36. Grooves 37 in piston 5 and sleeve 7 permit the flow of fuel into the chamber 21 beyond the ball check valve 36.

A plurality of piston rings 37a is provided in piston 5 to prevent the escape of the combustion gases into the atmosphere past piston 5. A stop preferably of synthetic rubber or composition is provided at 38 to reduce noise in the operation of the injection unit. If desired, similar stops (not shown) can be placed in seat 6.

Fitting into recess 39 is compression spring 40 (which can be a relatively weak one) having its upper end against stationary cover 18. Holes 41 connect recess 39 with the top piston ring 42.

Connecting rods 43 are threaded at 44 into the piston 5. The upper ends of rods 43 are threaded to engage nuts 45 and 46. Between nuts 45 and 46 is rigidly held a cross member 47 which has a central threaded hole 48 into which is screwed a piece 49 on the outer end of which is secured a gear. A control rack (not shown) meshes with the said gear. Piece 49 is hollowed out to accommodate a spring 13 the upper end of which bears against piece 49 and the lower end of said spring presses against the upper enlarged section 50 of valve 12. A cover 18 seats against the sleeve 3 at 51 and is held in place by stud 52 screwed into the cylinder head 1. Hose 53 preferably of synthetic rubber connects the supply pipe 33 with the rest of the supply piping (not shown) to allow for the relative motion of pipe 33 in relation to the rest of the supply. For the same reason preferably a synthetic rubber hose 54 connects by-pass pipe 31 with the rest of the injection system. The operation of the mechanism is as follows.

At the beginning of the compression stroke of the engine the piston 5 is in its lowest position with the flange of piston 5 on the seat at 6. The chamber 21 is filled with fuel and the valve 12 held down against its seat at 11 by the action of spring 13. As the compression pressure in the cylinder rises the force on the piston 5 upward is increased and the only combating forces to bring about equilibrium are the force of the wear spring 40, the force of friction, and the force of the fuel pushing downward in chamber 21. Consequently a great pressure is built up in chamber 21. The pressure in chamber 21 continues to rise until the pressure of the fuel upward on the small differential ring 55 produces a force which overcomes the force of spring 13 and causes valve 12 to rise from its seat at 11. Prior to this operation the piston 5 has remained essentially stationary moving upwardly only to the extent of the decrease in the volume of the fuel in the chamber 21 occasioned by the high pressure and any leakage in the system. Upon the lifting of the valve 12 equilibrium is destroyed and the piston 5 starts to move up rapidly. Due to the increase in volume of the chamber occasioned by the rise of valve 12 (because of the volume equal to the differential area 55 times the amount valve 12 rises) the piston 5 moves up an increment of its stroke with no injection taking place. When the volume of chamber 21 is reduced to its initial volume, that is prior to the rising of the valve 12, injection begins and since the piston 5 is then moving the inertia of its motion causes the injection to start with rapidity.

Injection continues until annular space 24 in sleeve 16 registers with hole 29 in sleeve 7. When this point is reached, the pressure on the fuel in chamber 21 is released because the fuel can then flow through annular space 24 out through hole 29 and into the by-pass system. As soon as the pressure on the fuel in chamber 21 is released, the valve 12 immediately closes due to the action of spring 13. Injection ends as soon as the pressure is released and because the valve 12 closes immediately there is no "dribbling" at the nozzle after the injection proper has ceased. Because the valve spring 13 is carried by the piston and the injection is ended by releasing the pressure in the chamber 21 instead of by stopping the piston, the piston is in full motion and is not decelerating when injection ends. The high injection pressure continues up to the point where injection ends thus insuring good atomization of the fuel injected near the end of the injection period. Piston 5 continues on its upward travel due to the force of the combustion pressure acting upon it until it strikes the stop at 38 where it remains until the pressure in the cylinder of the engine is reduced to the extent where the spring 40 aided by the fuel supply pressure can force the piston 5 back into its initial position.

From the time injection ends and while piston 5 is in its uppermost position against stop 38 and until piston 5 has, on its downward travel, passed the point where injection stopped in its preceding upward motion, fuel under low pressure will force ball check valve 36 open and flow through groove 37 into chamber 21 up through annular ring 23 through hole 22 and thence on out into the by-pass system. This insures that no fuel stays in the injector long enough to vaporize and thereby causes failure of the unit to operate.

After the piston 5 has on its downward stroke passed the point where injection ended on its upward stroke, the passage to the by-pass is cut off and consequently the rest of the stroke draws fuel through the check valve 36 into chamber 21, only, where it is ready for the next injection.

Because of wear or inaccuracy of fit some fuel under high pressure might leak up around the inside and outside of sleeve 16. To prevent this, holes 25 and 28 and annular recess 26 are provided to relieve the pressure into the by-pass system. There may also be a small amount of fuel leak farther up around the sleeve 16 into recess 39 due to the pressure differential, if any, between the by-pass system and the atmosphere but the hole 56 is provided to allow any such fuel to drain into recess 39, holes 41 being provided so that recess 39 is in communication with piston ring 42 whereby such fuel oil can be utilized to lubricate piston 5.

Governing of the operation of the engine is accomplished by a linear movement of the rack 20 which may be either manual or governor controlled, or a combination of the two. By moving control rack 20 the gear 19 is revolved and by action of the threads 17 the sleeve 16 is raised or lowered in relation to the cover 18 and the cylinder head 1. If the sleeve 16 is raised, the piston 5 must travel further on its upward stroke before annular recess 24 registers with hole 29, therefore, more oil is injected before the pressure is released to the by-pass system. By lowering sleeve 16 less oil is injected and by lowering sleeve 16 until hole 29 registers with annular recess 24 throughout the movement of piston 5, a high pressure is never built up in chamber 21 and consequently no fuel is injected. In this manner the engine can be stopped with the control rack 20.

The timing of the beginning of injection is accomplished by gear 49 which meshes with another control rack (not shown) similar to control rack 20. Revolving gear 49 raises or lowers it in relation to cross member 47 by the action of threads 48. Since cross member 47 is rigidly attached to piston 5, the lowering of gear 49 increases the tension of the spring 13 which then requires more force to overbalance it. This means that a higher pressure on the small annular ring 55 is required before the valve 12 will open. Since the rise of pressure in chamber 21 is almost proportional to the rise of the compression pressure in the cylinder, the foregoing conditions cause injection to start later in the cycle than it did before. If the tension on spring 13 be diminished, the reverse is true. This method then provides a simple means to change the point in the engine cycle where injection starts so that maximum efficiency can be obtained at varying speeds and loads.

In engines that are run for the most part at one load the gear control of spring 15 can be omitted in which case there is need only for a manual set adjustment to change the tension of spring 13. This arrangement would probably be used in aeronautical applications. Nuts 45 and 46 also provide a means of initially roughly adjusting the tension of spring 13.

The forms and number of the parts can be changed without departing from the gist of the invention as claimed.

What I claim is:

1. In means for injecting liquid fuel into the cylinder of an internal combustion engine, the combination of a housing, a piston in said housing having a nozzle and a passage therethrough for the fuel to pass to a fuel chamber in the neighborhood of said nozzle, a stem having a valve for closing and opening the fuel passage of the nozzle, yoke means connected with said piston, and spring means in said yoke means engaging said steam tending to cause the closing of the nozzle, a sleeve between said piston and said stem said sleeve being spaced from the nozzle to form the fuel chamber.

2. In means for injecting liquid fuel into the cylinder of an internal combustion engine, the combination of a housing, a movable piston in said housing, a nozzle and a passage for the fuel to pass to a fuel chamber in the neighborhood of said nozzle, a stem in said piston having a valve for closing and opening the fuel supply passage to the nozzle, a spring carried by said piston tending at one end to hold said valve in a position for closing the fuel passage to the nozzle and means on said piston for holding the other end of said spring, said holding means being adjustable while the injection means is operating to regulate the pressure of said spring.

3. In means for injecting liquid fuel into the cylinder of an internal combustion engine, the combination of a housing, a piston in said housing having a nozzle and a passage in the piston to a fuel chamber in the neighborhood of said nozzle, a stem in said piston having a valve for closing and opening the fuel supply passage to the nozzle, a spring tending yieldingly to hold said valve in a position to close the fuel passage to the nozzle, a second passage in said piston communicating with the fuel chamber for discharging excess fuel, said passages in the piston communicating with conducting members for said fuel fixed to and movable with the piston and extending externally of the housing.

4. In means for injecting liquid fuel into the cylinder of an internal combustion engine, the combination of a housing, a piston in said housing having a nozzle and a passage in the piston to the fuel chamber in the neighborhood of said nozzle, a stem in said piston having a valve for closing and opening the fuel supply passage to the nozzle, a spring tending yieldingly to hold said valve in a closing position, and conducting means for the fuel fixed to and movable with the piston and extending externally of the housing.

5. In means for injecting liquid fuel into the cylinder of an internal combustion engine, the combination of a housing, a piston in said housing having a nozzle and a passage in the piston to a fuel chamber in the neighborhood of said nozzle, a stem in said piston having a valve for closing and opening the fuel supply passage to the nozzle, a means tending yieldingly to hold said valve in a position to close the fuel passage of the nozzle and a conducting member for the fuel fixedly connected to and movable with the piston and extending externally of said housing.

6. In means for injecting liquid fuel into the cylinder of an internal combustion engine, the combination of a housing, a piston in said housing having a nozzle and a passage in the piston to a fuel chamber in the neighborhood of said nozzle, a stem in said piston having a valve for closing and opening the fuel supply passage to the nozzle, a means tending yieldingly to hold said valve in a position to close the fuel passage to the nozzle and a conducting member for the fuel fixedly connected to and movable with the piston and extending externally of said housing and a second passage in said piston communicating with the fuel chamber for discharging excess fuel.

7. In means for injecting liquid fuel into the cylinder of an internal combustion engine, the combination of a housing, a movable piston in said housing, a nozzle and a passage for the fuel to pass to a fuel chamber in the neighborhood of said nozzle, a stem in said piston having a valve for closing and opening the fuel passage to the nozzle, a spring carried by the piston tending at one end to normally hold said valve closed on said fuel passage of the nozzle, adjustable means for holding the other end of said spring, and a means carried by said piston whereby the pressure of said spring can be adjusted while the injection means is in operation.

8. In means for injecting liquid fuel into the cylinder of an internal combustion engine; the combination of a housing; a piston reciprocable axially in said housing, said piston having a bore, a nozzle, and means for opening and closing the nozzle; a member fitted in said bore and attached to, but axially adjustable with relation to said housing; the end of said member, the bore, and the nozzle forming parts of a fuel chamber; a fuel supply passage connected to said chamber; internal passages in said member, said internal passages being the sole means of communication between the fuel chamber and an annular recess on the outside of said member, said annular recess being positioned away from said end of said member; a by-pass in said piston leading from said bore, said by-pass being located such that it is interposed between the end and annular recess of said member during the interval of injection and so that it registers with the annular recess of said member only as the piston is moved a distance in the direction which brings the nozzle closer to the end of said member; and a check valve in said fuel supply passage of the piston for preventing the flow of fuel therein in a direction away from the nozzle and the fuel chamber.

VERNON C. BELT.

REFERENCES CITED

The following references are of record in the file of this patent:

UNITED STATES PATENTS

| Number | Name | Date |
|---|---|---|
| 2,135,925 | Tuscher | Nov. 8, 1938 |
| 2,168,668 | Davidson | Aug. 8, 1939 |
| 2,190,051 | Tuscher | Feb. 13, 1940 |
| 2,197,944 | Raven | Apr. 23, 1940 |
| 2,211,496 | Davidson, Jr. | Aug. 13, 1940 |
| 2,230,920 | Wirtsen | Feb. 4, 1941 |

FOREIGN PATENTS

| Number | Country | Date |
|---|---|---|
| 405,731 | Great Britain | Sept. 7, 1932 |